United States Patent Office 3,422,843
Patented Jan. 21, 1969

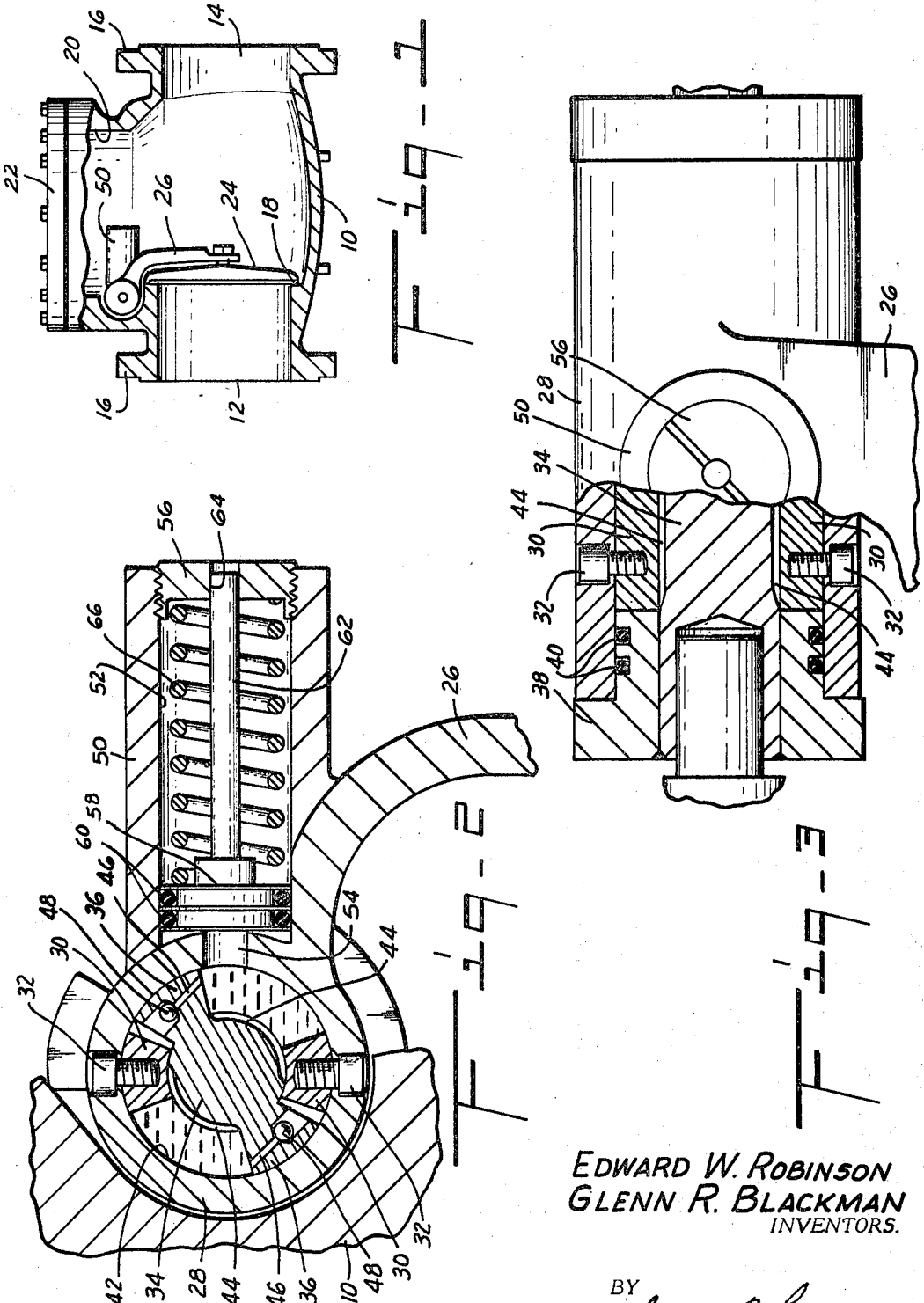

3,422,843
PRESSURE RELIEF MECHANISM FOR
ANTI-SLAM VALVES
Glenn R. Blackman, 154 Charles Ave., Shreveport, La.
71105, and Edward W. Robinson, 2500 Marilee Lane,
Apt. 2, Houston, Tex. 77027
Filed Oct. 7, 1966, Ser. No. 585,163
U.S. Cl. 137—514                                    5 Claims
Int. Cl. F16k 1/20, 21/10

This invention relates to valves of the anti-slamming type and more particularly to valves having pressure fluid mechanism for preventing the slamming of such valves upon closing of the same and means for limiting the pressure of the fluid which is developed in such mechanism during closing movement of the valve.

The invention is capable of wide application as a device for limiting the pressure which may be produced in pressure fluid cushioning or restraining mechanism and finds particular utility in connection with anti-slam mechanism of valves of the swing check type in which a restraining or cushioning pressure is produced by the closing movement of the valve to prevent sudden impact of the valve with the valve seat.

Check valves of the swinging or clapper type, as heretofore commonly constructed are often provided with cushioning or anti-slamming mechanism including a pressure chamber formed between the valve and valve casing and means in the chamber movable with the valve to apply pressure to fluid in the chamber upon closing movement of the valve to restrain such movement to prevent slamming of the valve against the valve seat. Such mechanism may take the form of a shaft mounted in the valve casing about which a hollow cylindrical part on the valve is rotatable about the axis of the shaft to form therewith a pressure chamber within which vanes attached to the parts are positioned to apply pressure to fluid in the chamber to restrain closing movement of the valve. Seal forming means is provided at the ends of the chamber, and by-pass means is provided between the parts through which fluid may flow freely during opening movement of the valve, but which restrict the flow of fluid therethrough during closing movement of the valve to cushion or restrain the closing movement of the valve.

In anti-slam mechanism of this type the pressure in the chamber increases continuously during closing movement of the valve and this increase becomes greater when the valve is more quickly closed, so that at times, the pressure developed in the chamber may cause extrusion or leakage of the seal forming means.

The present invention has for an important object the provision of pressure relief or control means for use with valve anti-slamming mechanism of the pressure chamber type to prevent an increase in the pressure in the chamber beyond a predetermined maximum pressure upon closing movement of the valve.

A further object of the invention is to provide anti-slamming mechanism for valves of the type mentioned embodying means for preventing disruption or leakage of the seal forming means of such mechanism due to the development of excessive fluid pressures therein.

Another object of the invention is the provision in valve anti-slamming mechanism of the pressure fluid chamber type, of means for allowing an increase in the volume of the chamber upon an increase in the pressure therein beyond a predetermined pressure, whereby the pressure in the chamber is limited to a predetermined maximum pressure.

A further object of the invention is to provide anti-slamming valve mechanism of the pressure chamber type including pressure control means which is of simple design and rugged construction and by which the maximum pressure which may be developed in the chamber upon closing of the valve may be regulated.

Briefly described, the invention is used in connection with valves of the anti-slamming type having pressure chamber means in which the pressure of fluid is increased upon closing movement of the valve to prevent slamming of the valve against the valve seat and comprises auxiliary chamber means in fluid flow communication with said pressure chamber and means for varying the volume of the auxiliary chamber in response to an increase in the pressure of fluid in the pressure chamber when such pressure reaches a predetermined maximum pressure to limit the pressure to which the fluid in the pressure chamber may use during closing movement of the valve.

The above objects and advantages of the invention may best be understood from the following detailed description, constituting a specification of the invention, when considered with the annexed drawings, wherein—

FIGURE 1 is a front elevational view, partly broken away and partly in cross-section, on a reduced scale, illustrating a preferred embodiment of the invention and showing the same as applied to a valve of the swing check type with the valve in closed position;

FIGURE 2 is a central, longitudinal, cross-sectional view, on an enlarged scale, of the pressure control or relief mechanism of the invention as illustrated in FIGURE 1; and FIGURE 3 is a side elevational view, partly broken away and partly in cross-section and on an enlarged scale, looking at the right hand side of the invention as illustrated in FIGURE 1.

Referring now to the drawings in greater detail the pressure relief mechanism of the invention is illustrated herein in connection with its application to a valve of the swinging clapper type having a valve casing 10 of usual construction provided with inlet and outlet openings 12 and 14, respectively, each of which is surrounded by an external, annular, perforated flange 16, whereby the valve may be connected into a flow line.

The casing 10 has an internal, annular, valve seat 18 formed therein, and may be provided with a side opening 20 closed by a removable cover 22.

Within the casing a valve 24 of the swinging disk type is supported on a swing arm 26, whose upper end is pivotally connected to the casing to allow the valve to swing into and out of seating engagement with the seat 18.

For the purpose of checking or restraining the closing movement of the valve to prevent slamming of the valve against the seat on closing of the valve, the swing arm 26 is formed at its upper end with an enlarged, cylindrical end portion 28, whose axis is disposed at right angles to the direction of swinging movement of the valve and within which, diametrically opposite, elongated, inwardly extending lugs or vanes 30 are secured, as by means of bolts 32.

A central shaft 34, extends longitudinally through the cylindrical part 28 and is connected at its opposite ends to the casing 10, and has diametrically opposite, external, radially outwardly extending, longitudinal vanes 36 formed thereon positioned within the part 28 between the internal vanes 30 thereof.

The cylindrical part 28 is closed at its opposite ends by bushings, such as that shown at 38 in FIGURE 3, each of which is provided with seal forming means, such as the O-rings 40 positioned in external grooves provided for the same, and which form fluid tight seals between the parts at the ends of an internal pressure chamber 42 formed between the part 28 and shaft 34.

The inner faces of the internal vanes 30 are curved to correspond to the diameter of the shaft 34, so that the chamber 42 is divided into two sections by the vanes, and the shaft 34 is cut away somewhat between the bushings 38 to form restricted passageways 44 through which fluid may flow from one section of the pressure chamber to the other past the vanes 30 as the valve 24 swings toward the seat 18 whereby the movement of the valve is restrained or cushioned during closing movement. The outer faces of the external vanes 46 conform closely to the curvature of the internal surface of the cylindrical part 28, and each of the external vanes 36 has a by-pass passageway 46 therethrough within which a check valve 48 is disposed to close the passageway against the flow of fluid therethrough during closing movement of the valve 24, but which opens to allow free flow of fluid therethrough during opening movement of the valve. By this means fluid may flow freely from one side of each vane 32 to the other to allow unrestricted movement of the valve 24 to open position, but the flow of fluid through passageways 46 is prevented during closing of the valve so that slamming of the valve is prevented by the restricted flow of fluid through passageways 44.

It will be apparent that the closing of the valve 24 will be more or less rapid depending upon the pressure of the back flow of fluid which may take place through the outlet 14, and that the pressure of fluid in the pressure chamber 42 will increase as the speed of closing of the valve is increased, so that at times upon rapid closing of the valve the pressure in chamber 42 may rise suddenly to a pressure sufficient to disrupt the seals 40 or cause leakage from the pressure chamber.

In order to prevent the rise in pressure in the pressure chamber 42 from causing such leakage or disruption of the seals 40, the pressure control device of the invention is provided, which includes a cylindrical part 50 attached to the part 28 and extending laterally therefrom to form an auxiliary chamber 52, whose inner end is in communication with the chamber 42 through an opening 54, and whose outer end is closed, as by means of a screw plug 56.

A piston 58 is movably disposed in the chamber 52 and is provided with suitable seal forming means, such as the O-rings 60 located in external grooves provided for the same. The piston 58 has a stem 62 which is slidably extended through a central opening 64 in the plug 56 to form a guide for the piston to assure that the piston is held concentrically in the cylinder and prevented from becoming misaligned therein, and the piston is yieldingly urged toward the inner end of the cylinder by a coil spring 66 in the cylinder surrounding the stem 62.

It will be apparent that the inward pressure on the piston 58 may be varied by changing the character of the spring 66 and also by screwing the plug 56 in or out to more or less compress the spring. The size of the auxiliary chamber may, of course, be varied as desired by changing the size of the cylinder 50, and the auxiliary chamber may, in general, be small, because of the relatively small increase in volume which may be required to prevent an excessive rise in the pressure in main chamber 42 when the valve has nearly reached its closed position.

In the operation of the invention, constructed as described above, the chamber 42 will be filled with suitable fluid, such as oil, which fluid will also fill the portion of the auxiliary chamber 52 located inwardly of the piston 58 through opening 54. As the valve moves from the closed position illustrated in FIGURES 1 and 2 toward open position under the influence of the pressure of fluid flowing through the flow-line through the inlet 12 and outlet 14, the fluid in chamber 42 may flow freely through passageways 46, so that there will be little or no restraint on the opening movement of the valve.

Upon the occurrence of a back flow in the flow line, however, the pressure of fluid flowing back through outlet 14 and inlet 12 will tend to close the valve 24, whereupon the back flow of fluid in chamber 42 through passageways 46 will be prevented by the closing of check valves 48, so that the fluid must flow through restricted passageways 44, thus restraining or cushioning the movement of the valve to prevent slamming on the seat 18.

Should the back flow in the flow line occur under high pressure, it will be apparent that a high pressure may be exerted on the valve 24 tending to close the valve suddenly with great force, thus building up a pressure in the chamber 42 which would damage the seals 40. By suitably adjusting the pressure of the spring 66 on piston 58, however, the piston will be moved toward the outer end of the cylinder 50, when the pressure in chamber 42 reaches a predetermined pressure, thus increasing the volume of the device so that the pressure does not exceed a predetermined maximum. By suitably adjusting the pressure on the spring 66 the pressure in the chamber 42 may be allowed to rise to a value to effectively prevent slamming of the valve 24, but prevented from rising to a pressure at which leakage or disruption of the sealing means will be caused.

It will thus be apparent that the invention provides pressure control means for valve anti-slamming mechanism by which fluid pressure in the mechanism may be utilized to restrain the closing movement of the valve, but which functions to limit the pressure within the mechanism to a value such that leakage or disruption of the seal forming means is prevented.

The invention is disclosed herein in connection with a particular embodiment of the same, which it will be understood is intended by way of illustration only, it being evident that the construction and arrangement of the parts may be varied, as well as the particular use which is made of the device, within the spirit of the invention and the scope of the appended claims.

Having thus clearly shown and described the invention, what is claimed as new and desired to secure by Letters Patent is:

1. In anti-slamming mechanism for valves of the type having a casing provided with an internal seat and a valve movably disposed in the casing for movement into and out of closing engagement with said seat,
  (a) means forming a fluid chamber in the housing,
  (b) means movably disposed in the chamber and connected to the valve for movement therewith and including
  (c) means for allowing unrestricted flow of fluid in the chamber in one direction from one side of said movable means to the other upon movement of said movable means in response to opening movement of the valve and for restricting the flow of such fluid from said other to said one side upon movement of said movable means in response to closing movement of the valve to yieldingly resist such closing movement, and
  (d) means for preventing the pressure in said chamber from exceeding a predetermined pressure upon closing movement of said valve comprising
  (e) means for causing an increase in the volume of said chamber in response to an increase in the pressure in said chamber when said pressure reaches a predetermined pressure.

2. The anti-slamming mechanism claimed in claim 1, wherein said valve is of the swinging check valve type, said means forming said fluid chamber comprising a shaft carried by the casing and a cylindrically shaped part on said valve surrounding and rotatably carried on said shaft and said means for causing an increase in the volume of said chamber comprises means forming a cylinder opening at one end into the chamber and whose other end is closed, a piston movably disposed in said cylinder and yieldable means positioned for coaction with the cylinder and piston to yieldingly resist movement of the piston in a direction to allow the flow of fluid from the chamber into the cylinder when the pressure in the chamber exceeds a predetermined pressure.

3. The anti-slamming mechanism claimed in claim 1, wherein said movable means includes first vane means carried by said casing and second vane means connected to said valve for movement therewith relative to said first vane means.

4. The anti-slamming mechanism claimed in claim 2, wherein said means forming said fluid chamber includes vane means on said shaft and said movable means includes vane means carried by said cylinder for rotational movement therewith between the vanes of said shaft.

5. The anti-slamming mechanism claimed in claim 1, wherein said means for causing an increase in the volume of said fluid comprises expansible chamber means into which fluid under pressure in said fluid chamber may flow and means for causing expansion of said expansible chamber means in response to an increase in the pressure in said fluid chamber when such pressure reaches a predetermined pressure.

References Cited

UNITED STATES PATENTS

| 2,760,512 | 8/1956 | Nechine | 137—107 |
| 3,106,220 | 10/1963 | Hose | 137—514 |
| 3,191,613 | 6/1965 | Bagwell | 137—110 |

LEONARD D. CHRISTIAN, *Primary Examiner.*

U.S. Cl. X.R.

251—48